(12) United States Patent
Gnecchi et al.

(10) Patent No.: US 10,422,862 B2
(45) Date of Patent: Sep. 24, 2019

(54) LIDAR APPARATUS (71) Applicant: SensL Technologies Ltd., County Cork (IE)

(72) Inventors: Salvatore Gnecchi, Cork (IE); John Carlton Jackson, County Cork (IE)

(73) Assignee: SensL Technologies Ltd., County Cork (IE)

( * ) Notice: Subject to any disclaimer, the term of this patent is extended or adjusted under 35 U.S.C. 154(b) by 377 days.

(21) Appl. No.: 15/377,263

(22) Filed: Dec. 13, 2016

(65) Prior Publication Data

US 2018/0164413 A1   Jun. 14, 2018

(51) Int. Cl.
G01C 3/08 (2006.01)
G01S 7/481 (2006.01)
G01S 17/89 (2006.01)

(52) U.S. Cl.
CPC .......... G01S 7/4816 (2013.01); G01S 7/4814 (2013.01); G01S 17/89 (2013.01)

(58) Field of Classification Search
CPC .... G01S 7/4816; G01S 7/4812; G01S 7/4863; G01S 7/4865; G01S 17/10; G01S 17/936
USPC ........................................................ 356/5.01
See application file for complete search history.

(56) References Cited

U.S. PATENT DOCUMENTS

| | | | |
|---|---|---|---|
| 2,949,808 A | 8/1960 | Thurow | |
| 5,159,412 A | 10/1992 | Willenborg | |
| 5,243,541 A * | 9/1993 | Ulich | G01S 7/487 348/31 |
| 7,301,608 B1 | 11/2007 | Mendenhall | |
| 9,476,980 B2 * | 10/2016 | Thayer | G01S 17/08 |
| 2002/0175294 A1 | 11/2002 | Lee et al. | |
| 2008/0304012 A1 | 12/2008 | Kwon | |
| 2014/0049783 A1 | 2/2014 | Royo Royo | |
| 2014/0146303 A1 | 5/2014 | Mitchell | |
| 2014/0175294 A1 | 6/2014 | Frach | |
| 2014/0303827 A1 * | 10/2014 | Dolgov | B60W 30/00 701/23 |
| 2015/0204978 A1 | 7/2015 | Hammes | |
| 2016/0223671 A1 | 8/2016 | Thayer et al. | |
| 2017/0153319 A1 | 6/2017 | Villeneuve | |
| 2018/0106900 A1 | 4/2018 | Droz | |
| 2019/0022948 A1 * | 1/2019 | Marra | B33Y 10/00 |

FOREIGN PATENT DOCUMENTS

DE   202014100836 U1   5/2015

OTHER PUBLICATIONS

International Search Report related to Application No. PCT/EP2017/082561 dated Mar. 8, 2018.
Action on the Merits by U.S.P.T.O regarding U.S. Appl. No. 15/383,310, filed Dec. 19, 2016.

* cited by examiner

Primary Examiner — Mark Hellner
(74) Attorney, Agent, or Firm — Polansky & Associates, P.L.L.C.

(57) ABSTRACT

A LiDAR apparatus comprising a laser source for emitting laser pulses. An SiPM detector is provided for detecting reflected photons. Optics and an aperture stop is provide. The aperture stop is provided intermediate the SiPM detector and the optics for limiting an angle of view of the SiPM detector.

20 Claims, 6 Drawing Sheets

LIDAR APPARATUS

FIELD OF THE INVENTION

The invention relates to a LiDAR apparatus. In particularly but not exclusively the present disclosure relates to a LiDAR apparatus which includes optics having an aperture stop to minimise focal length requirements such that the LiDAR apparatus is suitable for operating in compact environments.

BACKGROUND

A Silicon Photomultiplier (SiPM) is a single-photon sensitive, high performance, solid-state sensor. It is formed of a summed array of closely-packed Single Photon Avalanche Photodiode (SPAD) sensors with integrated quench resistors, resulting in a compact sensor that has high gain (~1×10$^6$), high detection efficiency (>50%) and fast timing (sub-ns rise times) all achieved at a bias voltage of ~30V. LiDAR (light detection and ranging) applications that use eye-safe near infrared (NIR) wavelengths such as Automotive ADAS (Advanced Driver Assistance Systems), 3D depth maps, mobile, consumer and industrial ranging are utilised in compact environments. LiDAR systems typically require optics having a large focal length which makes them unsuitable for operating in compact environments.

There is therefore a need to provide for a LiDAR system which utilises SiPM technology and addresses at least some of the drawbacks of the prior art.

SUMMARY

A Silicon Photomultiplier (SiPM) suffers of saturation in high ambient light conditions due to detector dead time. The present disclosure addresses this problem by limiting the angle of view (AoV) of the SiPM in order to avoid collecting undesirable noise, i.e. uncoherent ambient light. A short angle of view for a large sensor requires long focal lengths in a single-lens optical system. Such focal lengths are not suitable for compact systems. The present solution pairs the SiPM and a receiver lens with an aperture stop element. The aperture stop element stops the light coming from a large angle of view and spreads the collected light over the entire area of the SiPM effectively reaching the operation of a long focal length lens.

According, there is provided a LiDAR apparatus comprising:
  a laser source for emitting laser pulses;
  an SiPM detector for detected reflected photons;
  optics; and
  and an aperture stop provided intermediate the SiPM detector and the optics for limiting an angle of view of the SiPM detector.

In one aspect, the optics comprises a receive lens.

In another aspect, the optics comprises a transmit lens.

In a further aspect, the optics comprise a beam splitter such that a single lens is utilised for transmitting and receiving.

In one aspect, the beam splitter comprises a polarising mirror located intermediate the single lens and the SiPM detector.

In an exemplary aspect, the SiPM detector is a single-photon sensor.

In a further aspect, the SiPM detector is formed of a summed array of Single Photon Avalanche Photodiode (SPAD) sensors.

In one aspect, the aperture stop is located at the focal point of the optics.

In another aspect, the aperture stop has dimensions to match the required angle of view which is based on the size of the active area of the SiPM detector.

In a further aspect, the angle of view is less than 1 degree.

In an exemplary aspect, the total length between receiver optics and the SiPM detector is 10 cm or less.

In a further aspect, the total length between receiver optics and the SiPM detector is in the range of 1 cm to 6 cm.

In another aspect, the total length between receiver optics and the SiPM detector is less than 5 cm.

In one example, the size of the aperture stop is determined based on the size of the sensor area and the focal length of the optics.

In one aspect, the aperture stop diffuses light collected by the optics over a total active area of the SiPM detector.

In a further aspect, for a given focal length f, the angle of view $\theta_{x,y}$ of the SiPM detector placed on the focal point and with dimensions $L_{x,y}$ is given by:

$$\theta_{x,y} = 2 \times a\tan\left(\frac{L_{x,y}/2}{f}\right)$$

Where:
  Focal length of receiver lens: f
  Sensor horizontal and vertical length: $L_x$ and $L_y$
  Sensor horizontal and vertical angle of view: $\theta_{x,y}$ In one aspect, the aperture stop has dimensions to match the required angle of view according to:

$$P_{x,y} = 2 \times f \times \tan\left(\frac{\theta_{x,y}}{2}\right)$$

Where:
  Focal length of receiver lens: f
  Sensor angle of view: $\theta_{x,y}$
  Aperture stop dimensions: $P_{x,y}$.

In a further aspect, the laser source is an eye-safe laser source.

In another aspect, the laser source is a low power laser.

In one aspect, the SiPM detector comprises a matrix of micro-cells.

The present teaching also relates to an automotive system comprising a LiDAR apparatus; the LiDAR apparatus comprising:
  a laser source for emitting laser pulses;
    an SiPM detector for detected reflected photons;
    optics; and
    and an aperture stop provided intermediate the SiPM detector and the optics for limiting an angle of view of the SiPM detector.

These and other features will be better understood with reference to the followings Figures which are provided to assist in an understanding of the present teaching.

BRIEF DESCRIPTION OF THE DRAWINGS

The present teaching will now be described with reference to the accompanying drawings in which.

DETAILED DESCRIPTION

The present disclosure will now be described with reference to an exemplary LiDAR apparatus which utilises an SiPM sensor. It will be understood that the exemplary LiDAR apparatus is provided to assist in an understanding of the teaching and is not to be construed as limiting in any fashion. Furthermore, circuit elements or components that are described with reference to any one Figure may be interchanged with those of other Figures or other equivalent circuit elements without departing from the spirit of the present teaching. It will be appreciated that for simplicity and clarity of illustration, where considered appropriate, reference numerals may be repeated among the figures to indicate corresponding or analogous elements.

Figure 1:
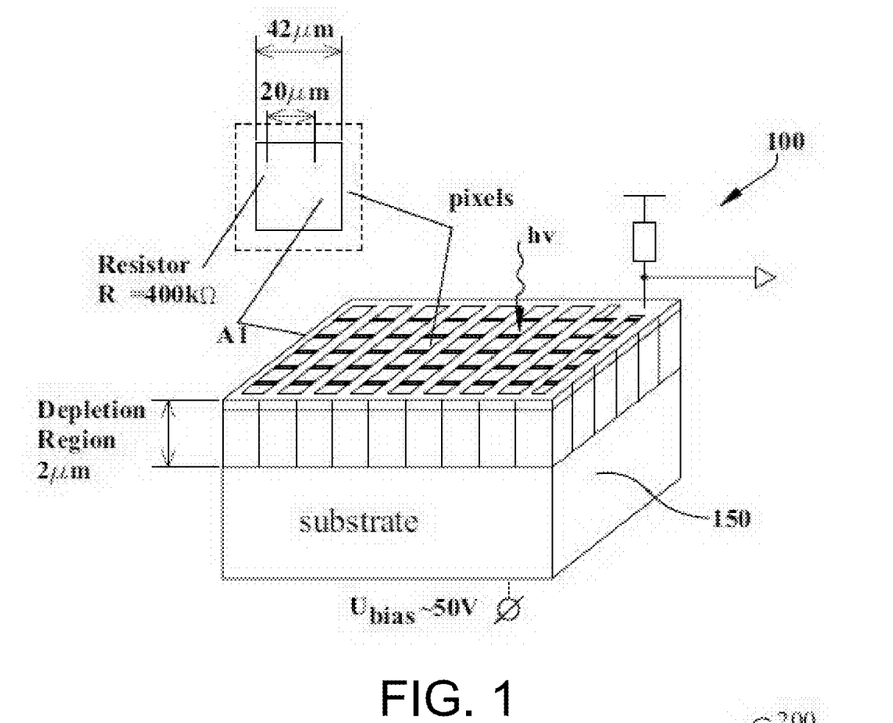
FIG. 1 illustrates an exemplary structure of a silicon photomultiplier.
Figure 2:
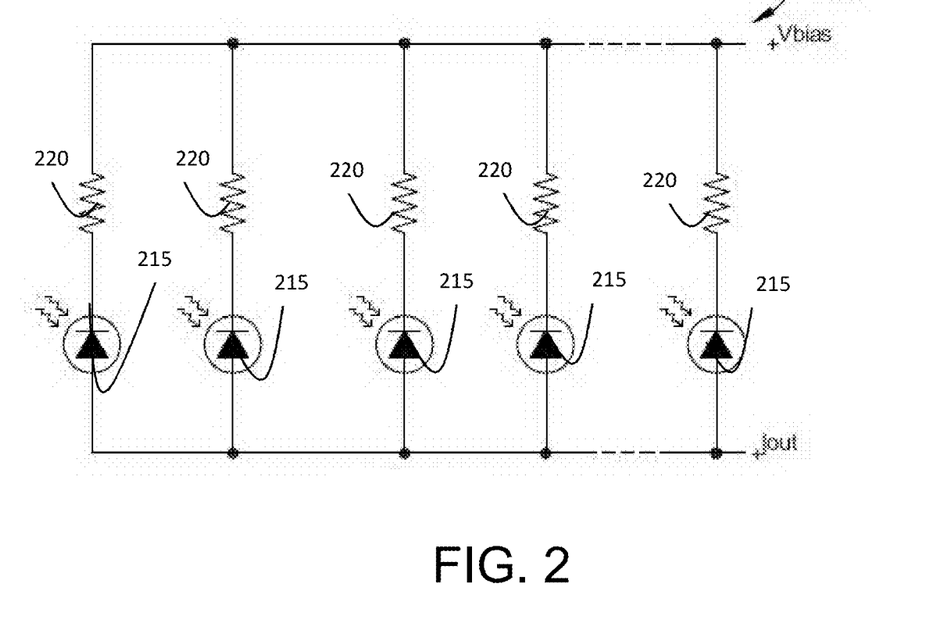
FIG. 2 is a schematic circuit diagram of an exemplary silicon photomultiplier.

Referring initially to FIG. 1, a silicon photomultiplier 100 comprising an array of Geiger mode photodiodes is shown. As illustrated, a quench resistor is provided adjacent to each photodiode which may be used to limit the avalanche current. The photodiodes are electrically connected to common biasing and ground electrodes by aluminium or similar conductive tracking. A schematic circuit is shown in FIG. 2 for a conventional silicon photomultiplier 200 in which the anodes of an array of photodiodes are connected to a common ground electrode and the cathodes of the array are connected via current limiting resistors to a common bias electrode for applying a bias voltage across the diodes.

The silicon photomultiplier 100 integrates a dense array of small, electrically and optically isolated Geigermode photodiodes 215. Each photodiode 215 is coupled in series to a quench resistor 220. Each photodiode 215 is referred to as a microcell. The number of microcells typically number between 100 and 3000 per mm². The signals of all microcells are then summed to form the output of the SiPM 200. A simplified electrical circuit is provided to illustrate the concept in FIG. 2. Each microcell detects photons identically and independently. The sum of the discharge currents from each of these individual binary detectors combines to form a quasi-analog output, and is thus capable of giving information on the magnitude of an incident photon flux.

Each microcell generates a highly uniform and quantized amount of charge every time the microcell undergoes a Geiger breakdown. The gain of a microcell (and hence the detector) is defined as the ratio of the output charge to the charge on an electron. The output charge can be calculated from the over-voltage and the microcell capacitance.

$$G = \frac{C \cdot \Delta V}{q}$$

Where:
G is the gain of the microcell;
C is the capacitance of the microcell;
$\Delta V$ is the over-voltage; and
q is the charge of an electron.

Figure 3:
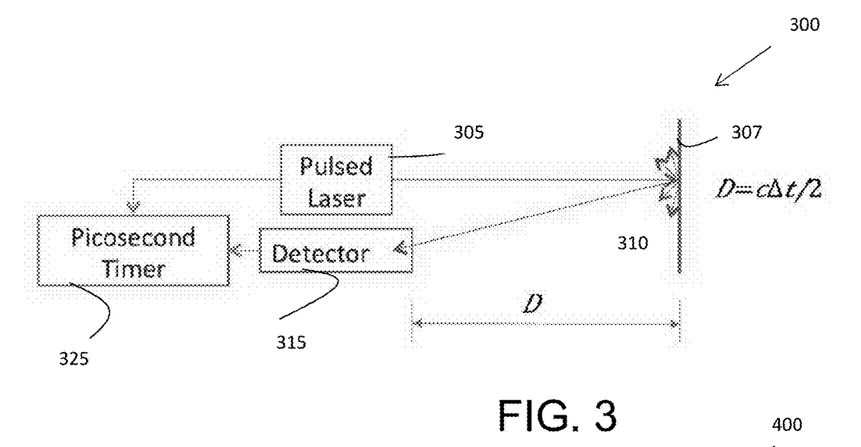
FIG. 3 illustrates an exemplary technique for a direct ToF ranging.

LiDAR is a ranging technique that is increasingly being employed in applications such as mobile range finding, automotive ADAS (Advanced Driver Assistance Systems), gesture recognition and 3D mapping. Employing an SiPM as the photo sensor has a number of advantages over alternative sensor technologies such as avalanche photodiode (APD), PIN diode and photomultiplier tubes (PMT) particularly for mobile and high volume products. The basic components typically used for a direct ToF ranging system, are illustrated in FIG. 3. In the direct ToF technique, a periodic laser pulse 305 is directed at the target 307. The target 307 diffuses and reflects the laser photons and some of the photons are reflected back towards the detector 315. The detector 315 converts the detected laser photons (and some detected photons due to noise) to electrical signals that are then timestamped by timing electronics 325.

This time of flight, t, may be used to calculate the distance, D, to the target from the equation $$D = c\Delta t/2, \qquad \text{Equation 1}$$

where c=speed of light; and
$\Delta t$=time of flight.

The detector 315 must discriminate returned laser photons from the noise (ambient light). At least one timestamp is captured per laser pulse. This is known as a single-shot measurement. The signal to noise ratio can be dramatically improved when the data from many singleshot measurements are combined to produce a ranging measurement from which the timing of the detected laser pulses can be extracted with high precision and accuracy.

Figure 4:
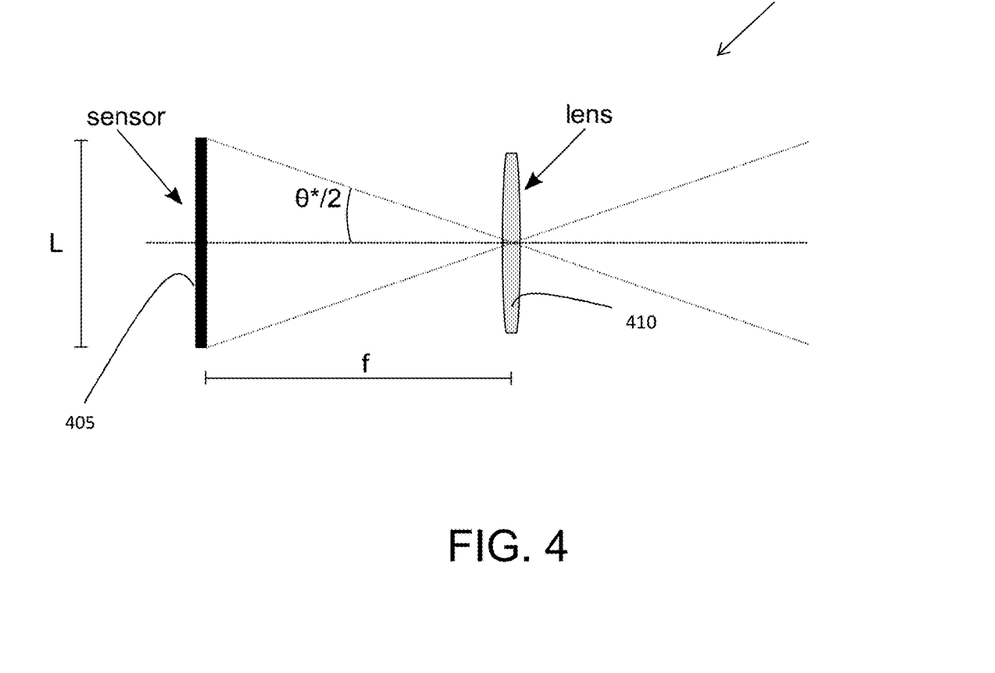
FIG. 4 illustrates an exemplary ToF ranging system.

Referring now to FIG. 4 which shows an exemplary SiPM sensor 400 which comprises an array of Single Photon Avalanche Photodiodes (SPAD) defining a sensing area 405. A lens 410 is provided for providing corrective optics. For a given focal length f of a lens system, the angle of view $\theta_{x,y}$ of a sensor placed on the focal point and with dimensions $L_{x,y}$ is given by:

$$\theta_{x,y} = 2 \times a\tan\left(\frac{L_{x,y}/2}{f}\right) \qquad \text{Equation 2}$$

Figure 5:
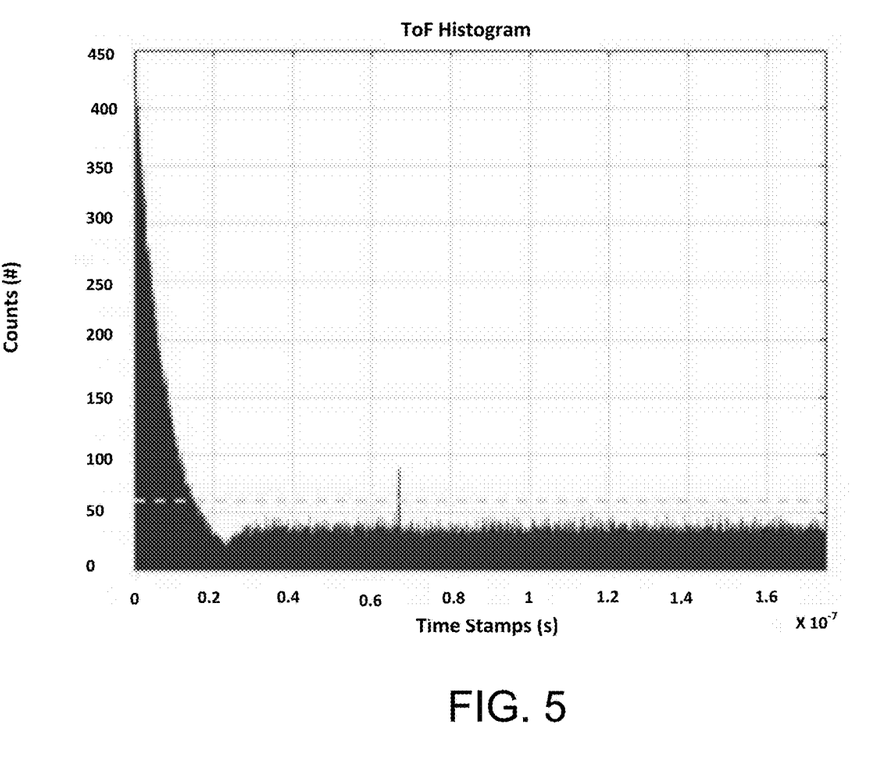
FIG. 5 illustrates an histogram generated using the ToF ranging system of FIG. 4.

Where:
Focal length of receiver lens: f
Sensor horizontal and vertical length: $L_x, L_y$
Sensor angle of view: $\theta_{x,y}$ This means that a large sensor has a large angle of view when a short focal length is used. When the lens aperture is widened, more ambient photons are detected while the number of returned laser photons remains constant. The SiPM 400 is prone to saturation as is evident from the large overshoot at the start of the histogram window in FIG. 5. When the sensor 400 is saturated the laser photons can no longer be detected by the SiPM 400, leading to a lower signal detection rate and lower overall $SNR_H$.

Figure 6:
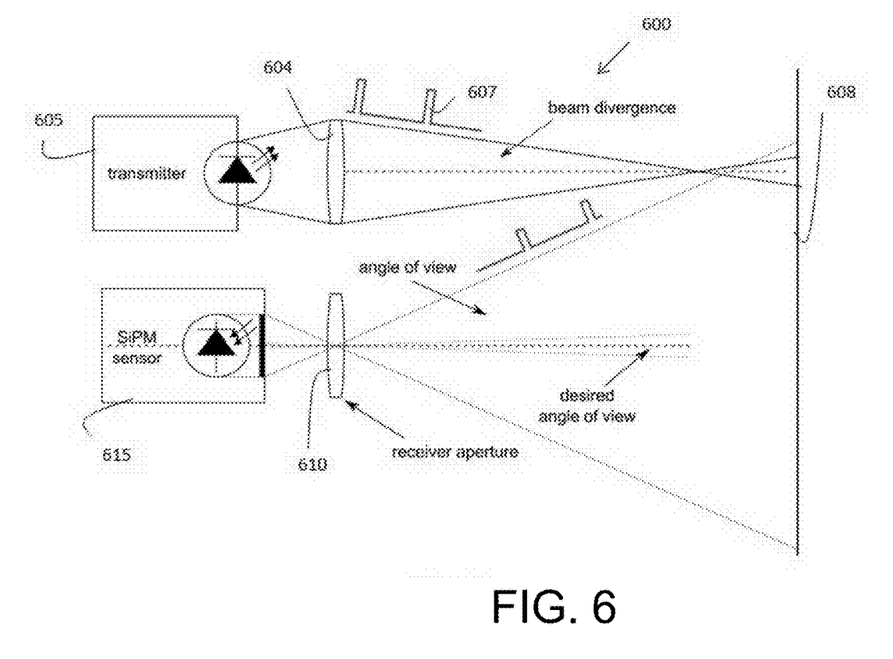
FIG. 6 illustrates an exemplary LiDAR apparatus incorporating an SiPM detector.
Figure 6A:
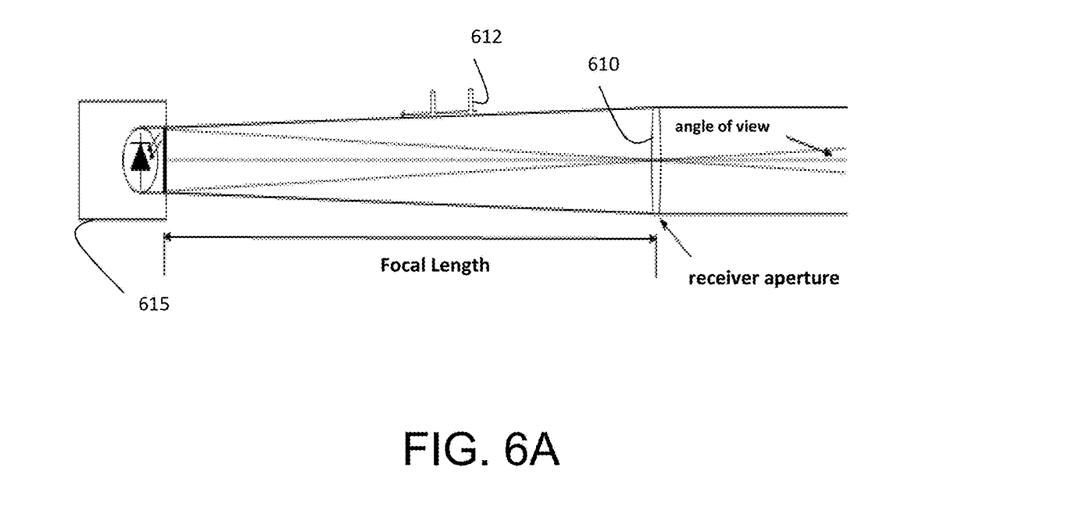
FIG. 6A illustrates details of the LiDAR apparatus of FIG. 6.

FIG. 6 illustrates an exemplary LiDAR system 600. Which includes a laser source 605 for transmitting a periodic laser pulse 607 through a transmit lens 604. A target 608 diffuses and reflects laser photons 612 through a receive lens 610 and some of the photons are reflected back towards a SiPM sensor 615. The SiPM sensor 615 converts the detected laser photons and some detected photons due to noise to electrical signals that are then timestamped by timing electronics. In order to avoid the SiPM sensor 610 reaching saturation point, the focal length is required to be kept relatively long. For a given focal length f of a lens system, the angle of view θ of the SiPM sensor 615 placed on the focal point and with length L is given by equation 2. Thus a large sensor requires a large angle of view when a short focal length is used as illustrated in FIG. 6A. Large angles of view (AoV), in the orders of many tens of degrees, up to 90°+, are used in state-of-the-art LiDAR sensors where the detector stares at the scene while a laser typically scans the scene for angular resolution. These sensors are typically based on PIN and avalanche diodes which have strong ambient light rejection. However, the signal to noise ratio SNR is highly affected by large angles of view since the noise level is set by the receiver AoV limiting the accuracy of the LiDAR system. Moreover, these devices are not suitable for long ranging LiDAR where the number of returned photons requires single photon detection efficiency. SiPM detectors using short angle of view such as SPAD or SiPM sensors satisfy the single photon detection efficiency requirement. Short AoV systems, i.e. <1 degree, may be either used as single point sensors in scanning systems to cover larger total AoV or arranged in arrays to cover the desired larger total angle of view respectively through scanning or simultaneous illumination. SPAD/SiPMs sensors however suffer from limited dynamic range due to a necessary recovery/recharge process of the sensors. At every photo detection in a microcell of the SiPM, the avalanche process needs to be quenched through, for example, a resistor which discharges the photocurrent and brings the diode out of the breakdown region. Then a recharge, passive or active, process begins to restore the diode bias voltage restoring the initial conditions ready for the next photo detection. The amount of time during which the quenching and recharge process take place is commonly referred to as dead time or recovery time. No further detections can happen in this time window due to the bias condition of the diode being outside the Geiger mode. In a SiPM, when a microcell enters the dead time window, the other microcells can still detect photons. Hence, the number of microcells define the photon dynamic range of the sensor allowing higher number of photons per unit time to be detected. When no microcells are available for detection due to dead time, the SiPM is said to be in its saturation region. A high number of diodes within an SiPM (microcells) is necessary to compensate the recovery process which inhibits the involved units of the detector. Large SiPMs provide high dynamic range. The size of the SiPM together with the focal length of the received sets the angle of view as per equation 2 and as illustrated in FIG. 6A.

SiPM detectors suffer from saturation in high ambient light conditions due to detector dead time. The present disclosure addresses this problem by limiting the angle of view (AoV) of the SiPM detector in order to avoid collecting undesirable noise, i.e. uncoherent ambient light. A short angle of view for a large sensor requires long focal lengths in a single-lens optical system. Such focal lengths are not suitable for LiDAR systems required to operate in compact environments where the detector is 10 cm or less from the receiving optics.

The present solution pairs the SiPM detector and a receiver lens with an aperture stop element which limits the AoV and reduces the focal length requirements thereby allowing SiPM detectors to be incorporated into LiDAR systems that operate in compact environment. The aperture stop element stops the light coming from a large angle of view and spreads the collected light over the entire area of the SiPM effectively reaching the detection efficiency of a long focal length lens arrangement. The term compact environment is intended to include environments where the detector is 10 cm or less from the receiving optics. It is also intended to include environments where the total length between receiver optics and the SiPM detector is in the range of 1 cm to 6 cm. In one example, the term compact environment refers to an environment where the total length between receiver optics and the SiPM detector is less than 5 cm.

Figure 7:
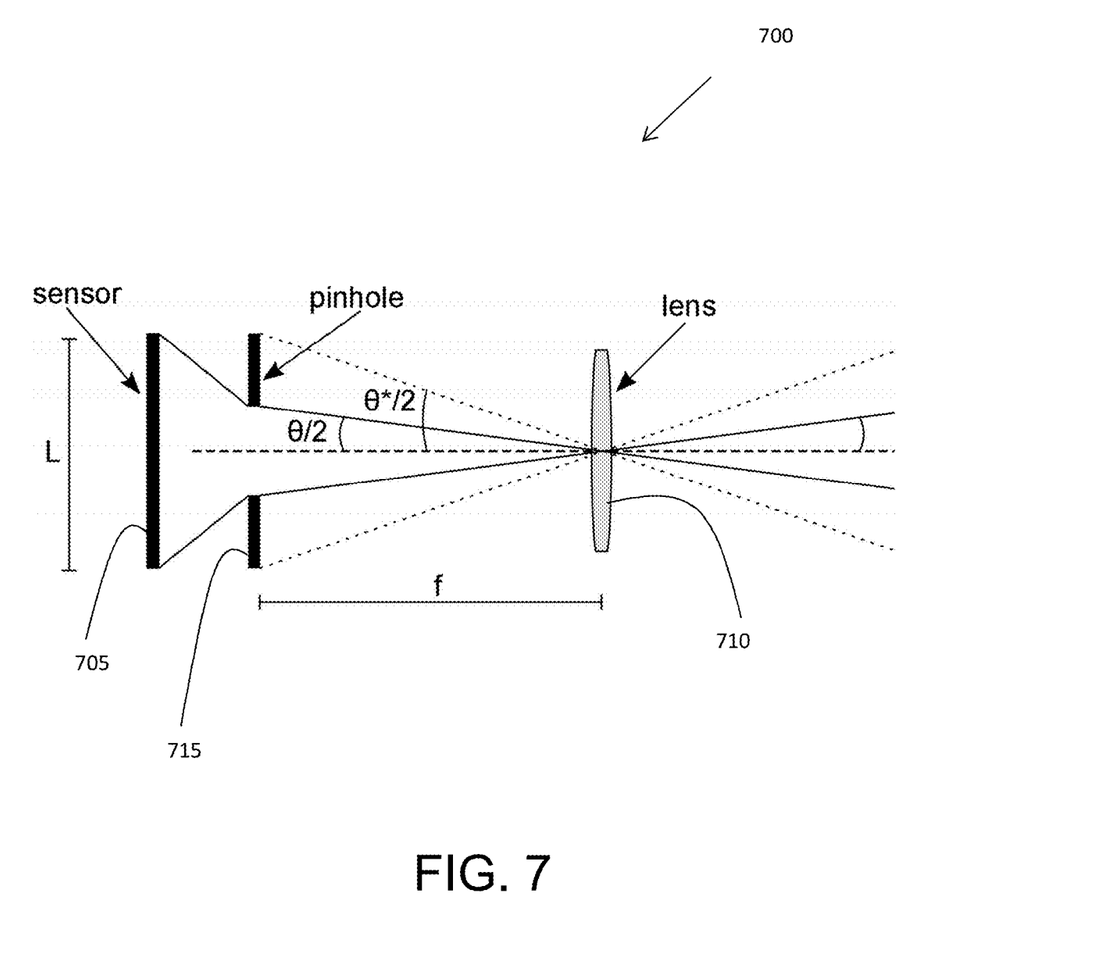
FIG. 7 illustrates details of a LiDAR apparatus in accordance with the present teaching.

Referring now to FIG. 7 which shows an exemplary SiPM sensor 700 which may be incorporated into a LiDAR apparatus in accordance with the present teaching. The SiPM sensor 700 comprises an array of Single Photon Avalanche Photodiodes (SPAD) defining a sensing area 705. A lens 710 is provided for providing corrective optics. An aperture stop 715 is provided intermediate the lens 710 and the sensing area 705 which blocks the light coming from a larger angle and diffuses the collected light onto the sensor area 705 overcoming therefore the need of longer focal lengths. An aperture is an opening or hole which facilitates the transmission of light there through. The focal length and aperture of an optical apparatus determines the cone angle of a plurality of rays that arrive to a focus in an image plane. The aperture collimates the light rays and is very important for image quality. When an aperture is narrow, highly collimated rays are admitted through which results in a sharp focus at the image plane. However, when the aperture is wide uncollimated rays are admitted through the aperture which limits the sharp focus for certain rays arriving from a certain distance. Thus, a wide aperture results in a sharp image for objects at a certain distance. The amount of incoming rays are also determined by the size of the aperture. An optical apparatus may have elements that limit the ray bundles. In optic these elements are used to limit the light admitted by the optical apparatus. These elements are commonly referred to as stops. An aperture stop is the stop that sets the ray cone angle and brightness at the image point. The focal length of the optics of the SiPM 700 may be significantly less than that of the optics of SiPM 400 as a result of the aperture stop 715.

Figure 8:
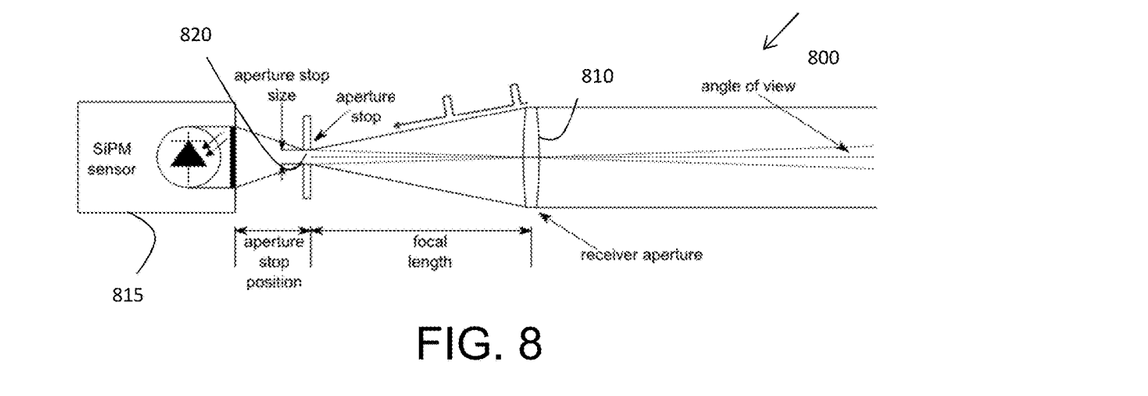
FIG. 8 illustrates details of a LiDAR apparatus in accordance with the present teaching.

In order to reduce the angle of view while maintaining the dynamic range required for given accuracy and ranging accuracy, a large sensor is typically paired with a long focal length lens aperture, as illustrated in FIG. 6A. Long focal lengths ~10+cm are however not appealing for compact systems where the maximum length is typically ~10 cm or less between detector and receive optics. Applications that require compact LiDAR systems includes autonomous automobiles, Advanced Driver Assistance Systems (ADAS), and 3D Imaging. The present solution provides a LiDAR apparatus 800 which utilizes the benefits for SPAD/SiPM technology and is suitable for being accommodated in a compact environments by incorporating an aperture stop element 820. The aperture stop element 820 is located between the sensor 815 and a short focal length lens 810. The aperture stop 820 has two primary functions. Firstly, the aperture stop is used to block the light coming from an original larger angle. The size of the aperture stop is based on the size of the sensor area and the focal length. Secondly, the aperture stop diffuses the collected light over the total active area of the sensor to exploit the dynamic range available thanks to the large sensor.

The dimensions and the position of the aperture stop relate both to the size of the sensor area and the desired angle of view and the focal length of the receiver lens. The dimensions $P_{x,y}$ must match the required angle of view according to:

$$P_{x,y} = 2 \times f \times \tan\left(\frac{\theta_{x,y}}{2}\right) \quad \text{Equation 3}$$

While the sensor has to be placed at a certain distance to ensure the diffusion of the light of the entire active area:

$$x, y = f \times \frac{L_{x,y}}{D_{lens}} \quad \text{Equation 4}$$

Wherein:
f is focal length of receiver lens;
$\theta_{x,y}$ is the sensor angle of view;
$P_{x,y}$ is aperture stop dimension; and
$D_{lens}$ is Diameter of receiver lens.

The light must be spread uniformly over the sensor active area; however, no imaging ability is required as the system is a single point sensor. Note that the given equations represent theoretical maxima which are given by way of example only. The distances may need adjustment to take account of tolerances.

Figure 9:
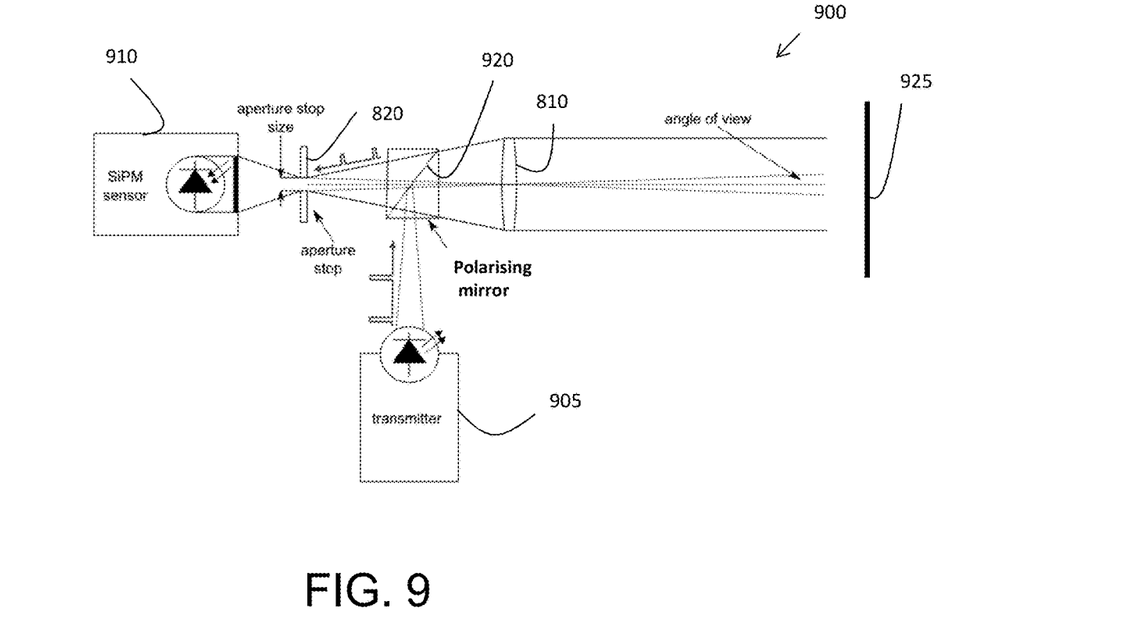
FIG. 9 illustrates another LiDAR apparatus which is also in accordance with the present teaching.

Referring now to FIG. 9 which illustrates an exemplary LiDAR apparatus 900 which is also in accordance with the present teaching. The LiDAR apparatus 900 is substantially similar to the LiDAR apparatus 800 and similar elements are indicated by similar reference numerals. The main difference is that the LiDAR apparatus 900 includes shared optics for the transmitter 905 and the receiver 910. A beam splitter provided by a polarizing mirror 920 is provided intermediate the lens 810 and the aperture stop 820. The polarizing mirror reflects the laser beam onto the scene and directs the reflected lights onto the SiPM sensor 910.

It will be appreciated by those of ordinary skill in the art that by utilizing an aperture stop allows the LiDAR systems 800 and 900 to have a short focal length while utilizing a large sensor area in the order of 1 mm² or greater. Since the LiDAR apparatus of the present teaching utilizes an optical system with a short focal length it allows the LiDAR system to be incorporated into compact environments having a length of 10 cm or less between the detector and receiver optics. The following table provides some exemplary dimensions for the components of the LiDAR apparatus in accordance with the present teaching. The exemplary dimensions are provided by way of example only and it is not intended to limit the present teaching to the exemplary dimensions provided.

| Active Area of SiPM sensor | Distance of aperture stop from SiPM sensor | Angle of view | Aperture stop dimensions |
|---|---|---|---|
| 1 mm² | 0.197 mm | 0.1° | 87.3 μm |
| 3 mm² | 0.59 mm | 0.5° | 436 μm |
| 6 mm² | 1.18 mm | 1° | 873 μm |
| Examples for a 1 inch lens with a 5 cm focal length | | | |

The LiDAR apparatus 900 may operate as a time of flight (ToF) LiDAR system such that a laser pulse exits a transmitter 905 at a known time. After the laser pulse strikes a target 925, reflected light is returned to the receiver 910. If the target 925 has a mirror like surface, then specular reflection will reflect photons in an angle equivalent to the incidence angle. This can result in the maximum number of photons reflected by the target being detected at the receiver 910. Standard avalanche photodiode (APD) sensors can be used to detect light from a retroreflector which reflects light back along the incident path, irrespective of the angle of incidence. However, most surfaces in the real world are non-specular targets and do not directly reflect the incident light. These non-specular surfaces can typically be represented as a Lambertian surface. When a Lambertian surface is viewed by a receiver with a finite angle of view (AoV) the quantity of photons received is invariant with the angle viewed and the photons are spread across a 2π (steradian surface. The net impact of a Lambertian reflector is that the number of returned photons is proportional to 1/distance². Additionally, the number of transmitted photons are limited by eye-safety constraints. Due to the 1/distance² reduction in the number of photons returned and the inability to simply increase the source power it is desired that every photon detected contributes to the overall accuracy of the LiDAR system 900.

It will be appreciated by the person of skill in the art that various modifications may be made to the above described embodiments without departing from the scope of the present invention. In this way it will be understood that the teaching is to be limited only insofar as is deemed necessary in the light of the appended claims. The term semiconductor photomultiplier is intended to cover any solid state photomultiplier device such as Silicon Photomultiplier [SiPM], MicroPixel Photon Counters [MPPC], MicroPixel Avalanche Photodiodes [MAPD] but not limited to.

Similarly the words comprises/comprising when used in the specification are used to specify the presence of stated features, integers, steps or components but do not preclude the presence or addition of one or more additional features, integers, steps, components or groups thereof.

What is claimed is:
1. A LiDAR apparatus comprising:
a laser source for emitting laser pulses;
a SiPM detector for detected reflected photons;
optics; and
an aperture stop provided intermediate the SiPM detector and the optics for limiting an angle of view of the SiPM detector, wherein the aperture stop diffuses light collected by the optics over a total active area of the SiPM detector.
2. The LiDAR apparatus as claimed in claim 1, wherein the optics comprises a receive lens.
3. The LiDAR apparatus as claimed in claim 2, wherein the optics comprises a transmit lens.
4. The LiDAR apparatus as claimed in claim 1, wherein the optics comprise a beam splitter such that a single lens is utilised for transmission and receiving.
5. The LiDAR apparatus as claimed in claim 4, wherein the beam splitter comprises a polarising mirror located intermediate the single lens and the SiPM detector.
6. The LiDAR apparatus as claimed in claim 1, wherein the SiPM detector is a single-photon sensor.
7. The LiDAR apparatus as claimed in claim 1, wherein the SiPM detector is formed of a summed array of Single Photon Avalanche Photodiode (SPAD) sensors.
8. The LiDAR apparatus as claimed in claim 1 wherein the aperture stop is located at the focal point of the optics.
9. The LiDAR apparatus as claimed in claim 8, wherein the aperture stop has dimensions to match the required angle of view which is based on the size of the total active area of the SiPM detector.
10. The LiDAR apparatus as claimed in claim 1 wherein the angle of view is less than 1 degree.

11. The LiDAR apparatus as claimed in claim 1, wherein the total length between the optics and the SiPM detector is less than 10 cm.

12. The LiDAR apparatus as claimed in claim 1, wherein the total length between the optics and the SiPM detector of the LiDAR apparatus is in the range of 1 cm to 6 cm.

13. The LiDAR apparatus as claimed in claim 1, wherein the total length between the optics and the SiPM detector is less than 5 cm.

14. The LiDAR apparatus as claimed in claim 1, wherein the size of the aperture stop is determined based on the size of an area of the SiPM detector and the focal length of the optics.

15. The LiDAR apparatus as claimed in claim 1, wherein for a given focal length f, the angle of view θ of the SiPM detector placed on the focal point and with a length L is given by:

$$\theta_{x,y} = 2 \times atan\left(\frac{Lx, y/2}{f}\right)$$

Where:
  Focal length of receiver lens: f;
  Sensor horizontal and vertical length: $L_x$, $L_y$; and
  Sensor angle of view: $\theta_{xy}$.

16. The LiDAR apparatus as claimed in claim 1, wherein the aperture stop has dimensions to match the required angle of view according to:

$$P_{x,y} = 2 \times f \times \tan\left(\frac{\theta x, y}{2}\right)$$

Where:
  Focal length of receiver lens: f;
  Sensor angle of view: $\theta_{xy}$; and
  Aperture stop size: $P_{xy}$.

17. The LiDAR apparatus as claimed in claim 1, wherein the laser source is an eye-safe laser source.

18. The LiDAR apparatus as claimed in claim 1, wherein the laser source is a low power laser.

19. The LiDAR apparatus as claimed in claim 1, wherein the SiPM detector comprises a matrix of micro-cells.

20. An automotive system comprising the LiDAR apparatus of claim 1.

* * * * *